United States Patent [19]

Fochesato

[11] 4,193,911
[45] Mar. 18, 1980

[54] NONINFLAMMABLE OLEFIN FIBER AND METHOD OF PRODUCING SAME

[76] Inventor: Antonio Fochesato, 260 Summer St., Boston, Mass. 02210

[21] Appl. No.: 864,459

[22] Filed: Dec. 27, 1977

[30] Foreign Application Priority Data

Oct. 5, 1977 [IT] Italy ............................. 85639 A/77

[51] Int. Cl.$^2$ ..................... C08K 3/22; C08K 5/53; C08K 5/02
[52] U.S. Cl. ............................. 260/45.7 P; 57/904; 252/8.1; 260/23 H; 260/42.45; 260/45.7 R; 260/45.75 W
[58] Field of Search ........... 260/42.45, 42.46, 45.7 R, 260/45.7 RL (U.S. only), 45.7 P, 45.7 PT (U.S. only)

[56] References Cited

U.S. PATENT DOCUMENTS

| | | | |
|---|---|---|---|
| 3,202,567 | 8/1965 | Muri et al. | 260/42.44 |
| 3,262,894 | 7/1966 | Green | 260/2.5 AJ |
| 3,331,806 | 7/1967 | Fior et al. | 260/42.46 |
| 3,403,118 | 9/1968 | Listner | 260/42.46 |
| 3,412,052 | 11/1968 | Taylor et al. | 260/45.7 PT |
| 3,480,582 | 11/1969 | Brooks | 260/45.75 B |
| 3,699,077 | 10/1972 | Murray | 260/45.7 RL |
| 3,730,917 | 5/1973 | Hesskamp | 260/45.7 PT |
| 3,738,958 | 6/1973 | Paul | 260/45.7 RL |
| 3,786,087 | 1/1974 | Conard et al. | 260/45.7 RL |
| 3,832,326 | 8/1974 | North et al. | 260/42.15 |
| 3,878,166 | 4/1975 | Woycheshin et al. | 260/42.46 |
| 3,909,484 | 9/1975 | Beavon | 260/45.7 P |
| 3,927,145 | 12/1975 | Gaeckel et al. | 260/45.7 RL |
| 3,927,231 | 12/1975 | Desitter et al. | 428/480 |
| 4,028,330 | 6/1977 | King | 260/45.7 PT |
| 4,038,237 | 7/1977 | Snyder | 260/42.46 |
| 4,065,517 | 12/1977 | Okada et al. | 260/45.7 PT |

OTHER PUBLICATIONS

Monsanto Bulletin, Phosgard C-22-R, 1965.

Primary Examiner—Hosea E. Taylor
Assistant Examiner—R. A. White
Attorney, Agent, or Firm—Richard P. Crowley

[57] ABSTRACT

Nonflammable textile fibers and the process of producing such fibers, which fibers are composed of a polymer, such as an olefinic polymer, containing in combination a nonflammable amount of a trihydrate of aluminum oxide, preferably a silane-coated oxide, and a halogenated organic polyphosphonate compound or a halogenated organic compound or a combination of such halogenated compounds.

13 Claims, No Drawings

NONINFLAMMABLE OLEFIN FIBER AND METHOD OF PRODUCING SAME

BACKGROUND OF THE INVENTION

A number of processes and additives have been prepared and used to make textile fibers, and products produced therefrom, flame-retardant or noninflammable. However, often such additives or treatments result in fibers which present toxicity problems on use or which form toxic materials, such as gases, when exposed to heat or open flames. In addition, some additives are quite expensive or are required in such high concentrations to be effective that their use affects the fiber properties and become expensive at such concentration levels. It is, therefore, most desirable to provide textile fibers, particularly fibers composed of olefinic resins and similar polymers, with nonflammable properties at low cost, with low concentrations of additives and without the disadvantages of prior-art materials.

SUMMARY OF THE INVENTION

My invention relates to noninflammable textile fibers, products produced therefrom, the process of producing such fibers, and the additive composition used in such fibers and process.

In particular, my invention concerns noninflammable textile fibers composed of olefinic resins which contain a noninflammable amount, in combination, of a metal oxide hydrate which, on heating, releases water vapor, such as alumina hydrate, and a halogenated compound, such as an organic polyphosphonate or a bromo or chlorinated organic compound or a mixture or combination thereof. My textile fibers are noninflammable or nonburning in accordance with ASTM-D635-74 and, on exposure to flame, contract and melt, but do not burn or support a flame. The textile fibers of my invention further contract without combustion and without smoke or toxic combustion gases or products associated with other prior-art materials.

My invention provides a process by which textile fibers and textile-protecting products; that is, whether or not through blown or flat-film-fibrilated fibers, in particular with a polyolefin polymer, such as polyethylene with low specific weight (LDPE), polyethylene with high specific weight (HDPE) or a polymer or copolymer or polypropylene (PP), are made noninflammable.

My process also can be applied to nonwoven textiles of the extruded type; that is, usually called "spunbonded" fabric; that is, products of the very same synthetic resins as mentioned before. Such fibers can be produced by extrusion through a die spinneret or be split fibers prepared from blown or flat-film material. My noninflammable textile fibers may be employed usefully for use with woven and nonwoven sheet materials, such as carpet-backing materials, fabrics and other products employing fibers.

As is known, there are processes to make textiles non-inflammable which are made from fibers and resins of another nature; however, they form toxic matters which are very injurious to health. My invention provides for the very first time the making noninflammable or polyethylene and polypropylene fabrics and fibers, with all advantages of fibers on a polyolefin basis; that is, low costs, low weight and good covering properties.

My textile fibers are composed of a thermoplastic polymer, particularly olefinic fibers and films, such as those composed of polyethylene, polypropylene, ethylene and propylene copolymers and terpolymers, polybutene and polypentene and pentene and butene copolymers, such as polymers of 4-methylpentene, and similar polymers, such as polyester fibers of ethylene, propylene, butene or pentene with terephthalate like polyethylene terephthalate.

The noninflammability additive composition comprises, as an essential ingredient, a hydrated material, such as an alumina hydrate, such as the trihydrate of aluminum oxide, which, on exposure to heat, releases the hydrate molecules as water vapor. In the preferred embodiment, the hydrated alumina is coated with a lubricant to enable the particulated hydrate material to be blended easily into the polymer. The most preferred lubricant-binder materials used for treatment of the hydrated alumina comprise organic silane or silicone compounds, such as vinyl tris (beta methoxy-ethoxy silane). The silane compounds provide for easy blending of the hydrated alumina and good binding of the alumina in the polymer, due to the compatible organic nature of the terminal vinyl group thereon.

Other lubricants may be employed for treating the alumina, such as metallic stearates like sodium, potassium, calcium, magnesium and zinc stearates, fatty-acid amides, fatty-acid esters, waxes, chlorinated paraffin, solid silicone compounds and the like.

The other essential ingredient of my additive composition comprises a halogenated organic compound, particularly a phosphorous-containing compound like a polyphosphonate. A wide variety of halogenated compounds, particularly bromo or chloro or bromo/chloro compounds, may be employed in combination with the hydrated alumina. Typical compounds which are suitable include, but are not limited to: neopentyl bromide, pentabromochlorocyclohexane; halogenated organic polyphosphonate such as Phosgard, a trademark of Monsanto Chemical Co. Phosgard C-22-R is

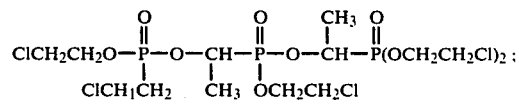

ethylene bis tris (2-cyanoethyl) phosphonium bromide (Cyagard RF, a trademark of American Cyanamide Co.); tris (beta chloroethyl) phosphate; and other brominated and chlorinated organic compounds (such as Citex BN 21; BN 451; and BCL 462, trademarks of City Service Co. for brominated organic compounds and Dechlorane 515, a trademark of Hooker Chemical and Plastics Co. for a chlorinated organic compound), alone or in combination.

My additives may be used alone or with other additives, such as heat stabilizers, plasticizers, blowing agents, UV stabilizers, flame retardants, lubricants, property and viscosity modifiers, dyes and colorants, pigments, fillers, antistatic additives, antioxidants and the like.

The concentration of hydrated alumina in the fibers may vary; however, typical amounts in excess of about 12.5% by weight of the fibers makes fiber extrusion difficult, while concentrations of less than about 1% by weight are not desired. The preferred range of the hydrated alumina in the fiber is 2.5 to 5.0%.

The amount of the halogenated organic compound may vary, but typically ranges from about 1.0% by weight of the fiber to 5.0%; for example, 1.25 to 2.5% by weight. The amount of the alumina and halogenated compound may vary; however, sufficient amount of the additive composition should be used to make the fiber nonburning without affecting the desirable mechanical strength of the fiber in the extrusion or fiber-forming process and any fiber-drawing process.

I have found that in combination in the textile fibers of my invention the alumina and halogenated organic compounds provide new and unexpected results and exhibit synergism in such combination.

My invention will be described for the purposes of illustration only in regards to the preparation of certain noninflammable fibers containing preferred additive combinations. However, various changes and modifications may be made in the formulations set forth herein without departing from the spirit and scope of my invention.

DESCRIPTION OF THE EMBODIMENTS

The formulas of the additives to be added to the blends of synthetic resins destined for the production of the textile and textile-protecting fibers are based on the use of trihydrate of aluminum oxide; that is, treated preferably with vinyltris (beta methoxy-ethoxy silane) or other silane, and of halogenated organic polyphosphonate and eventual additional compounds, depending on the application of the products.

Three formulas are especially given as an example, which does not imply that only those three formulas are possible, and the same are suitable for polyethylene with a high specific weight, polyethylene with a low specific weight and polypropylene.

The formulas are:

Formula 1: (Suitable for polyethylene with a high specific weight)

| | |
|---|---|
| 12.50% | trihydrate of aluminum oxide treated with vinyltris beta methoxy-ethoxy silane |
| 2.50% | halogenated organic polyphosphonate |
| 15.00% | total addition |

Formula 2: (Suitable for polyethylene with a low specific weight)

| | |
|---|---|
| 12.50% | trihydrate of aluminum oxide treated with vinyltris beta methoxy-ethoxy silane |
| 1.25% | halogenated organic polyphosphonate |
| 4.25% | zinc borate |
| 18.00% | total addition |

Formula 3: (Suitable for polypropylene)

| | |
|---|---|
| 12.50% | trihydrate of aluminum oxide treated with vinyltris beta methoxy-ethoxy silane |
| 1.50% | halogenated organic polyphosphonate |
| 1.50% | penta-bromine cyclohexanechloride |
| 15.50% | total addition |

All of the above-mentioned formulas are based on a working of positive synergism; that is, developed by the various additives of which the formulas are composed. Fibers composed of the formulas are noninflammable when tested under ASTM D635-74. The additives used alone do not provide the results and are not noninflammable fibers when used separately in the same concentration.

The trihydrate of aluminum oxide contains about 35% of chemical-composed water that requires a caloric power in order to release itself from the aluminum trioxide. The effect of the dehydration plus the rarefaction of the inflammable vapors by water vapor takes place at temperatures which coincide with the isothermic working of the compounds which are exposed to the heat. Consequently the effect is the cooling down of the polymer that puts a limit to the pyrolysis of the inflammable vapors. The only vapor that releases itself is water vapor, whereas, at the same time, the halogen compounds in the polymer are working as a fire trap and the trihydrate of aluminum oxide as a smoke reducer. The small quality of halogens in the formulas does not cause a supply of poisonous gas, seeing that these high-molecular-weightcompounds are extraordinarily stable as well.

My method to make textile fibers and textile-protecting fibers on a polyolefin basis noninflammable represents a distinct advantage in the production of noninflammable textile fibers, seeing that, in a very inexpensive way, these fibers can replace other noninflammable fibers which are already on the market for a long time, such as the modacryl (modified acryl) and vinyl-chloride fibers which, although not inflammable, melt and crimp when exposed to heat, during which process a great deal of corrosive and poisonous smoke is set free, seeing that these fibers have a high chlorine content. As a rule, the modacrylic fibers, depending on the type in question, contain between 40 and 60% of vinyl or vinylidene chloride, whereas the vinyl-chloride matters consist of 100% vinyl chloride, with a chlorine content varying from 55% up to 64% according to its type.

The production of the noninflammable polymer chips, suitable for the various applications to form films or fibers, is as follows: One mixes in a fanning machine or in a blending apparatus with turning blades the basic polymer (PE or PP) in the form of chips or in stabilized powder form, adding the percentage indicated on noninflammable-making additives with a maximum of 5% paraffin oils, with an adhesive working of a derivative oil of an acid of bay and mixing those produces during 30 to 35 minutes. Thereupon one puts this mixture into a long screw-shaped extrusion machine (28 to 30 diameter), spouting this mixture (at the temperatures indicated for the different polymers) into long threads and cutting the same into calibrated chips. The chips thus obtained are ready to be worked up in the various extrusion machines which are used for textile and textile-protecting fibers; that is, multithreads, blown film, flat film, closely related nonwovens of the extruded type.

It is also possible not to extrude the mixture beforehand and to work it up directly; however, one obtains better results with the method of extrusion as mentioned before, which guarantees a complete distribution of the flame-inhibiting compositions in the chips.

It is evident that the examples given are not to be considered as a limitation for the percentages given for the formulas in questions; however, only as an example without any restriction, seeing that other percentages can be used as well, in which case the essential properties of the formulas remain unchanged without exceeding the limits of the invention.

What I claim is:

1. A noninflammable polypropylene fiber comprising in combination as flame-retartant agents:
   (a) from about 1.0% to 12.5% by weight of a hydrated alumina, which alumina has been treated with a lubricant material to permit the alumina to be incorporated into the olefinic resin composition;
   (b) from about 1.0% to 5.0% by weight of a halogenated organic polyphosphonate characterized by a phosphorus-to-carbon bond repeated along the main oligomer chain of the polyphosphonate;
   (c) from about 1.0% to 5.0% by weight of a halogenated organic compound selected from the group consisting of
      (i) a bromochlorocyclohexane, and
      (ii) a 2:1 Diels-Alder adduct of a hexahalocyclopentadiene and a cyclodiene; and
   (d) the said fiber being noninflammable when tested by ASTM-D635-74.

2. The fiber 1of claim 1 wherein the hydrated alumina is present in an amount of from about 2.5% to 5.0% by weight 3. The fiber of claim 1 wherein the halogenated organic polyphosphonate is present in the amount of from about 1.25% to 2.5% by weight.

4. The fiber of claim 1 wherein the lubricant material is an organic silane compound.

5. The fiber of claim 4 wherein the organic-silane compound is vinyl tris beta methoxy-ethoxy silane.

6. The fiber of claim 1 wherein the halogenated organic compound is a pentabromochlorocyclohexane.

7. The fiber of claim 1 wherein the halogenated organic polyphosphonate compound is represented by the structural formula:

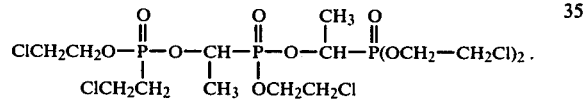

8. The fiber of claim 1 wherein the halogenated organic polyphosphonate consists essentially of chlorine atom as the halogen.

9. The fiber of claim 1 wherein the halogenated organic compound is the 2:1 Diels-Alder adduct of hexachlorocyclopentadiene and 1,5 cyclooctadiene.

10. A noninflammable polypropylene fiber comprising in combination as flame-retardant agents:
    (a) from about 1.0% to 12.5% by weight of a hydrated alumina which has been treated with a lubricant material to permit the alumina to be blended into the olefinic resin composition;
    (b) from about 1.0% to 5.0% by weight of a halogenated organic polyphosphonate having the structural formula:

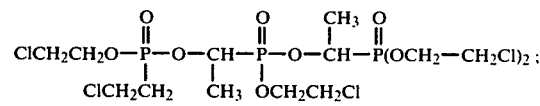

(c) from 1.0% to 5.0% by weight of a halogenated organic compound selected from the group consisting of
       (i) a pentabromochlorocyclohexane, and
       (ii) a 2:1 Diels-Alder adduct of hexachlorocyclopentadiene and a cyclooctadiene; and
    (d) the said fiber characterized by being noninflammable when tested by ASTM-D635-74.

11. A process for the production of a noninflammable polypropylene textile fiber, which process comprises:
    (a) admixing into a polypropylene polymer composition, employed to prepare a polypropylene fiber, an additive composition, which additive composition comprises in combination as active ingredients
       (i) from about 1.0% to 12.5% by weight of a hydrated alumina,
       (ii) from about 1.0% to 5.0% by weight of a halogenated organic polyphosphonate characterized by a phosphorus-to-carbon bond repeated along the main oligomer chain of the polyphosphonate, and
       (iii) from about 1.0% to 5.0% by weight of a halogenated organic compound selected from the group consisting of
          (a) a bromochlorocyclohexane, and
          (b) a 2:1 Diels-Alder adduct of a hexahalocyclopentadiene and a cyclodiene; and
    (b) forming the thermoplastic polymer composition containing the additive composition into a noninflammable textile fiber which is noninflammable when tested by ASTM-D635-74.

12. The process of claim 11 wherein the halogenated organic is a pentabromochlorocyclohexane.

13. The process of claim 11 wherein the hydrated alumina has been treated with vinyl tris beta methoxy-ethoxy silane.

* * * * *